US007542920B1

(12) United States Patent
Lin-Hendel

(10) Patent No.: US 7,542,920 B1
(45) Date of Patent: Jun. 2, 2009

(54) SYSTEM FOR INTERACTIVE COMPUTER-ASSISTED ON-LINE AUCTIONS

(75) Inventor: Catherine Lin-Hendel, 18850 Blythswood Dr., Los Gatos, CA (US) 95030

(73) Assignee: Catherine Lin-Hendel, Los Gatos, CA (US)

( * ) Notice: Subject to any disclaimer, the term of this patent is extended or adjusted under 35 U.S.C. 154(b) by 542 days.

(21) Appl. No.: 09/628,773

(22) Filed: Jul. 29, 2000

Related U.S. Application Data

(60) Provisional application No. 60/146,702, filed on Jul. 30, 1999.

(51) Int. Cl.
*G06Q 30/00* (2006.01)
(52) U.S. Cl. .................................................. 705/26
(58) Field of Classification Search .............. 705/14, 705/26, 27, 37
See application file for complete search history.

(56) References Cited

U.S. PATENT DOCUMENTS

| | | | | | |
|---|---|---|---|---|---|
| 5,485,174 | A | * | 1/1996 | Henshaw et al. | 345/684 |
| 5,621,430 | A | * | 4/1997 | Bricklin | 345/856 |
| 5,835,896 | A | * | 11/1998 | Fisher et al. | 705/37 |
| 5,877,761 | A | * | 3/1999 | Shoji et al. | 345/784 |
| 5,890,138 | A | * | 3/1999 | Godin et al. | 705/26 |
| 5,892,498 | A | * | 4/1999 | Marshall et al. | 345/684 |
| 5,970,471 | A | * | 10/1999 | Hill | 705/26 |
| 5,974,398 | A | * | 10/1999 | Hanson et al. | 705/14 |
| 6,026,377 | A | * | 2/2000 | Burke | 705/27 |
| 6,058,379 | A | * | 5/2000 | Odom et al. | 705/37 |
| 6,191,799 | B1 | * | 2/2001 | Purdy | 345/473 |
| 6,264,104 | B1 | * | 7/2001 | Jenkins et al. | 235/383 |
| 6,538,698 | B1 | * | 3/2003 | Anderson | 348/333.05 |

OTHER PUBLICATIONS

Pinker et al. "Managing Online Auctions: Current Business and Research Issues", Management Science, 2003, vol. 49, No. 11, pp. 1457-1484.*

* cited by examiner

*Primary Examiner*—Mark Fadok
(74) *Attorney, Agent, or Firm*—Morgan, Lewis & Bockius LLP

(57) ABSTRACT

A system and method for an interactive, computer-assisted on-line auction wherein at least one array of images of objects for auction are scrolled on a display device so that a viewer can view the objects, obtain detailed information regarding objects of interest an submit bids on those objects the viewer desires to purchase. The objects in the array can be sorted into rows and columns by criteria such as manufacturer, type of good, or time until which bids are accepted. The system can include an array for objects that can currently be bid upon and another array for objects that can be bid upon at a future time. Certain objects of interest to a viewer can be selectively rotated for three-dimensional viewing by clicking on an appropriate button. A viewer can select a plurality of objects of interest, wherein monitoring screens are then composed and displayed on the display device for each selected object, each monitoring screen providing the viewer with an enlarged graphical representation of an object, detailed textual information regarding an object, and information regarding the auction for an object such as current bid price, time remaining to submit a bid and a bid submission box. The system also provides a system of selectively programmable alerts which can use visual or audible cues to alert the viewer to some occurrence, such as a predetermined amount of time remaining to submit a bid on an object.

24 Claims, 16 Drawing Sheets

Prior Art
Figure 1A

Home Listings Buyers Sellers Search Help News/Chat Site Map

Test drive the new site. Check out the new Help section!
Save time! Try the new, fun way to shop -- the Gallery.

Updated: 07/15/99, 15:00 PDT Check eBay official time
Use your browser's reload button to see the latest version.

Sell your item in the Antiques : Furniture category NEW!

Subscribe now! Get your charter subscription to eBay magazine.

☐ Search only in Antiques : Furniture
☐ Search within titles and descriptions

◄ Top : Antiques : Furniture ►
Current Auctions

Current || New Today || Ending Today || Completed || Going, Going, Gone || Gallery

Featured Auctions in Furniture
Current Auctions

To find out how to be listed in this section and seen by thousands, please visit this link.

| Item | Price | Bids | Ends PDT |
|---|---|---|---|
| NEW! 18th Century Chippendale Desk Rhode Island Pic | $1000.00 | - | 07/22 12:42 |
| NEW! OAK ROCKER--CURVED SLAT BACK~ARMS~SOFT MISSION Pic | $59.00 | - | 07/25 11:11 |
| NEW! GREAT VICTORIAN CARVED THRONE CHAIR Pic | $40.00 | - | 07/22 11:03 |
| NEW! EARLY VICTORIAN WALNUT CARVED M.T. PIER TABLE Pic | $200.00 | - | 07/22 10:59 |
| NEW! CHOICE FIGURED BREAK FRONT, HEPPLEWHITE Pic | $250.00 | - | 07/22 10:51 |
| NEW! OAK ROCKING ARM CHAIR~QUARTER SAWN BACK Pic | $59.00 | - | 07/25 10:46 |
| NEW! RARE BOMBE MARQUETRY DESK Pic | $300.00 | - | 07/22 10:46 |
| NEW! VICTORIAN MARQUETRY ARM CHAIR Pic | $100.00 | - | 07/22 10:41 |
| NEW! VICTORIAN BEDROOM SET-WALNUT WITH MARBLE Pic | $1500.00 | 1 | 07/25 09:36 |
| NEW! OAK SERPENTINE DRESSER~MIRROR ON WISHBONE Pic | $99.00 | - | 07/25 09:25 |
| NEW! Art Nouveau French Bed w/Inlay L@@K!!! Pic | $400.00 | - | 07/25 09:22 |

Prior Art
Figure 1B1

| | | | |
|---|---|---|---|
| OAK BOOKCASE/CHINA CABINET~STRETCHER BASE~2 D | $99.00 | - | 07/25 08:14 |
| wonderful 4 dr. silver chest | $177.50 | 2 | 07/22 07:14 |
| PAIR OF SOLID MAHOGANY SEWING/NITE/SIDE STAND | $152.50 | 6 | 07/21 21:51 |
| CARVED, CLAW FOOT ZEBRA MAHOGANY CENTER TABLE | $152.50 | 9 | 07/21 21:38 |
| FOUR PERIOD JACOBEAN HEAVILY CARVED CHAIRS | $100.00 | - | 07/21 21:26 |
| SUPER TURN OF CENTURY OAK VICTORIAN SECRETARY | $680.00 | 11 | 07/24 19:56 |
| RARE! Kate Gleason Owned Carved Figural Chair | $250.00 | - | 07/21 19:52 |
| GREAT 1940s WALNUT TEA CART | $51.00 | 2 | 07/21 19:40 |
| C1900 AMERICAN OAK LION'SHEAD CLAWFOOT TABLE | $1725.00 | 26 | 07/21 19:23 |
| 1790-1820 Hooded Primitive Cradle~Stenciling! | $21.00 | 3 | 07/21 19:19 |
| ANTIQUE SELECT OAK FLOORING, 1000sq.ft. | $2700.00 | - | 07/21 19:14 |
| SUPERB MAHOGANY CURVED GLASS CORNER CHINA | $187.50 | 9 | 07/21 18:37 |
| Wonderful Country Victorian Washstand | $86.00 | 4 | 07/21 18:37 |
| Shell Back Chippendale Chairs (8) L@@K>>> | $404.00 | 6 | 07/21 18:19 |
| TIGER MAPLE CHEST Circa 1800 | $227.50 | 3 | 07/21 18:17 |
| HIGHLY CARVED AMERICAN CHIPPENDALE BREAKFRONT | $635.00 | 7 | 07/21 16:49 |
| OA Offers: French Boudoir chairs - 1920's | $45.00 | 8 | 07/21 15:23 |
| LARGE WALNUT VICTORIAN BOOKCASE | $695.00 | 2 | 07/24 15:20 |
| OA Offers: 1800's Rickshaw | $15.50 | 3 | 07/24 15:19 |
| OA Offers: Biedermeier Style Wall Sconces | $102.50 | 12 | 07/24 15:15 |
| Edwardian English Oak TEA STAND~DUMB WAITER | $50.00 | 1 | 07/21 15:01 |
| Like New LANE CEDER CHEST (1944) | $61.00 | 4 | 07/21 14:29 |
| Outstanding "DECO" Waterfall Ceder Chest | $102.50 | 6 | 07/21 14:05 |
| FLAME MAHOGANY GAME TABLE c.1820 (PIX) | $455.00 | 12 | 07/24 13:39 |
| ANTIQUE WICKER DESK AND CHAIR | $100.00 | 1 | 07/21 13:34 |
| REGENCY DINING/CONFERENCE TABLE-15 FT.LONG | $1500.00 | - | 07/24 13:31 |
| CARVED VICTORIAN STOOL | $81.00 | 5 | 07/21 13:18 |

Prior Art
Figure 1B2

| All Items in Furniture | | | |
|---|---|---|---|
| Current Auctions | | | |
| For more items in this category, click these pages: <br> = 1 = 2 3 4 5 6 ... 20 ... 36 (next page) | | | |
| Item | Price | Bids | Ends PDT |
| MAGNIFICENT EGYPTIAN DINING ENSEMBLE | $5000.00 | - | 07/26 16:55 |
| Majorelle Armoire' | $8000.00 | - | 07/26 16:51 |
| Old Brass Ornamental Griffin Fireplace Fan | $9.99 | - | 07/23 16:51 |
| OLD HAND CRAFTED DOLL'S WARDROBE!! | $25.00 | - | 07/23 16:43 |
| MASSIVE CLAWFOOT OAK LAMP TABLE | $385.00 | - | 07/23 16:42 |
| OLD HEREKE PERSIAN Oriental Rug NiceRugs | $400.00 | - | 07/26 16:30 |
| An Encylopedia of Desks By Mark Bridge 1988 | $9.50 | - | 07/23 16:29 |
| VICTORIAN EBONIZED/GILT INCISED SEWING BENCH | $29.99 | - | 07/21 16:29 |
| Furniture Refinishing: The Furniture Doctor | $5.00 | - | 07/23 15:58 |
| Mahogany Round Tea Table | $140.00 | - | 07/23 15:41 |
| French Style Desk | $290.00 | - | 07/26 15:32 |
| Armoire | $1500.00 | - | 07/26 15:30 |
| 1860'S MAHOGANY CHEST OF DRAWS | $100.00 | - | 07/23 15:29 |
| *19thC. MAHOGANY FLAMBE 1 DRAWER STAND/TABLE* | $49.99 | - | 07/21 15:26 |
| Duncan Phyfe Pair of Lyre Mahogany Drum Table | $295.00 | - | 07/23 15:24 |
| Louis XVI Mahogany Bedroom Suit Antique | $595.00 | - | 07/23 15:10 |
| Officer's Folding Canopied Bed 1850's NICE | $250.00 | - | 07/26 15:08 |
| Glass Floor Protectors for Furniture | $3.00 | - | 07/23 15:03 |
| Antique Oak Office Chair | $25.00 | - | 07/26 15:02 |
| Old Old Victorian Stand with engravings NEAT | $20.00 | - | 07/19 14:58 |
| Duncan Phyfe Mahogany Antique Sofa | $295.00 | - | 07/23 14:56 |
| STUNNING FRENCH ARMOIRE | $99.99 | - | 07/23 14:52 |
| Duncan Phyfe Mahogany Living Room Suit | $295.00 | - | 07/23 14:48 |
| Oak Rolltop Desk | $900.00 | - | 07/26 14:47 |
| * Leather Couches * tan double pillow | $100.00 | - | 07/26 14:47 |
| Duncan Phyfe Mahogany Dining Table Antique | $100.00 | - | 07/23 14:36 |
| Duncan Phyfe Mahogany Barrel Chair Antique | $75.00 | - | 07/23 14:33 |

Prior Art
Figure 1B3

 Home Listings Buyers Sellers Search Help News/Chat Site Map

Subscribe now! Get your charter subscription to eBay magazine.
Give us your comments! Test drive the new, revised site.
Free escrow! Buy and sell safely with i-Escrow.

SUPER TURN OF CENTURY OAK VICTORIAN SECRETARY
Item #131862095
Antiques:Furniture

Description
Bid

| | | | |
|---|---|---|---|
| Currently | $899.00 (reserve met) | First bid | $99.99 |
| Quantity | 1 | # of bids | 16 (bid history) (with emails) |
| Time left | 9 days, 0 hours + | Location | CANFIELD, OHIO |
| Started | 07/14/99, 19:56:34 PDT | ✉ (mail this auction to a friend) | |
| Ends | 07/24/99, 19:56:34 PDT | 🎁 (request a gift alert) | |
| | | Featured Category Auction | |
| Seller | suellen10 (843) ★ | | |
| | (view comments in seller's Feedback Profile) (view seller's other auctions) | | |
| | (ask seller a question) | | |
| High bid | horner2 (1) | | |
| Payment | Visa/MasterCard, Money Order/Cashiers Checks, Personal Checks. See item description for payment methods accepted | | |
| Shipping | Seller ships internationally. See item description for shipping charges | | |

Seller assumes all responsibility for listing this item. You should contact the seller to resolve any questions before bidding. Currency is dollar ($) unless otherwise noted.

Description

Reeded posts supporting shelves, stick and ball galleries, carved gingerbread, beading, ornate brass hardware, beveled mirror and original finish are the first phrases that come to mind when I think about describing this oak secretary which is truly a show stopper. The drawers are all mortised (I think that's the correct word) and the 2 lower drawers lock with the same key as the drop front on the desk. The secretary is 67 1/2" tall, 30" wide and 14 3/8" deep. I was told by an auctioneer friend that this piece could have been made in Sheboygan. As with all things beautiful and old, it comes with some concerns and they would be, the shelf over the top drawer and the very bottom center shelf have lost a portion of the finish, there is a 2 inch section of beading missing from the left side, below the right hand door there is a small section of wood missing which is 1" square, slight silver loss on beveled mirror, 3 "filigree" brackets are missing from the pigeon holes, 2 pieces of trim are missing from the underside of the bottom shelf where the shelf meets the legs and the old boards on the back are loose. The finials on the top need tightened down and several pieces of trim need to be reglued. You will find a couple of scratches and a ring inside one of the doors. The secretary needs a good cleaning and polishing also. I have tried to be very accurate listing any problems and hope I haven't missed anything. None of the above are critical concerns and the missing pieces can be replicated by a craftsman. Do not let these concerns prevent you from owning one of the finest secretary's I have ever seen. I can promise you that even the most modest new secretary made of pressed sawdust would cost you more than the reserve on this item. This item is Prior Art
Figure 1C1

REPLACEMENT SHEET out of an Estate in Euclid, Ohio. The woman was born in 1913. She was born of Swedish immigrant parents. Her estate contained many wonderful and very unique items. Please email any questions before bidding. Suellen10 has been selected as a Bronze Power Seller. Satisfaction guaranteed on any items sold that do not meet the item description. Item may be returned within 30 days of the auction end with prior approval by this seller. (This does not include buyer's remorse.) Buyer responsible for making arrangements for pickup and shipping and payment of all shipping charges. Payment for secretary is due in 7 days. MasterCard, Visa, Money Orders and Certified Checks ship next business day. Personal checks ship after check has cleared bank (10-14 days). Ohio buyers add 5.5% sales tax.

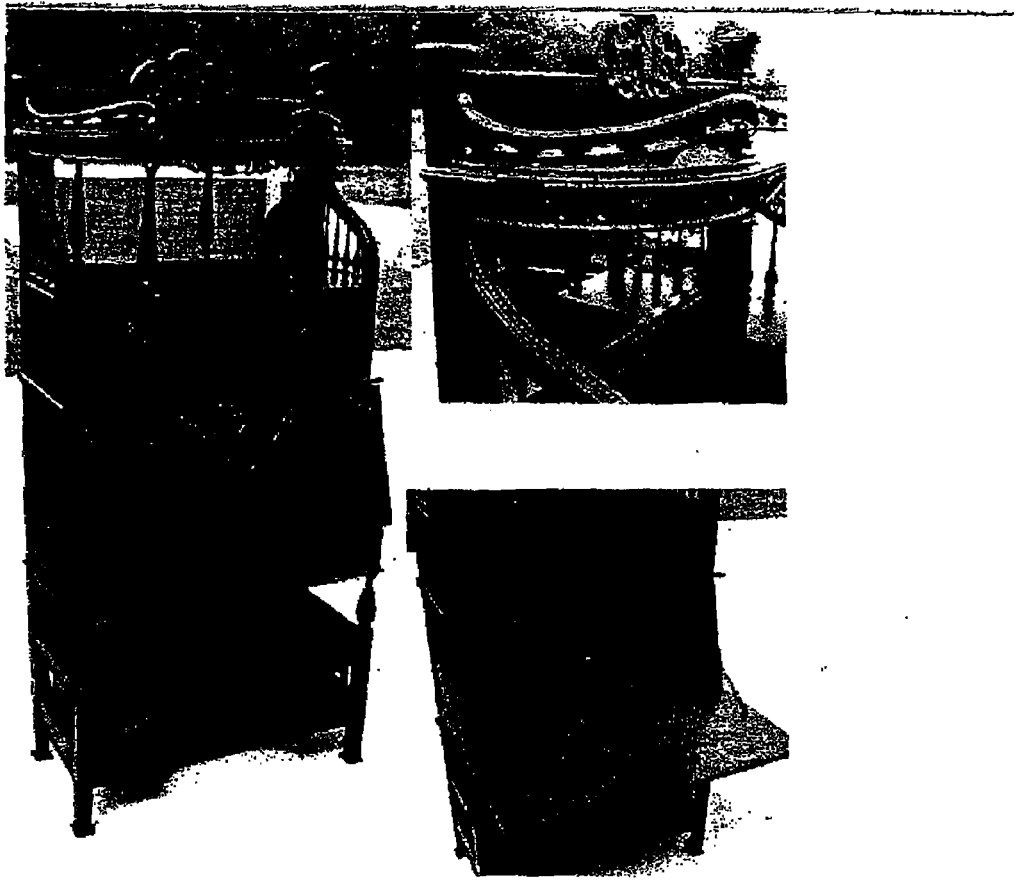

SUPER TURN OF CENTURY OAK VICTORIAN SECRETARY (Item #131862095)
Prior Art
Figure 1C2

| | |
|---|---|
| Current bid | $899.00 |
| Bid increment | $10.00 |
| Minimum bid | $909.00 |

Registration required. eBay requires registration in order to bid. Find out how to become a registered user. It's fast and it's free!

---

To finalize your bid, you will need to submit your User ID and Password in the next step. You will not be asked to enter your User ID and Password anywhere on this page.

*Current minimum bid is $909.00* 
Your maximum bid.

Please type only numerals and the decimal symbol (.) if required. Do not include currency symbols such as $.

Binding contract.
  Placing a bid is a binding contract in many states. Do not bid unless you intend to buy this item at the amount of your bid.

Proxy bidding for all bids
  Please bid the maximum amount you are willing to pay for this item. Your maximum amount will be kept secret; eBay will bid on your behalf as necessary by increasing your bid by the current bid increment up until your maximum is reached. This saves you the trouble of having to keep track of the auction as it proceeds and prevents you from being outbid at the last minute unless your spending limit is exceeded. (See an example of proxy bidding). Also, in case of a tie for high bidder, earlier bids take precedence. And, keep in mind that you cannot reduce your maximum bid at a later date. Unless otherwise noted, bids are in U.S. dollars.
  If you have bid on this item before, note that your new bid must be greater than your previous bid.

--- ebY    Home Listings Buyers Sellers Search Help News/Chat Site Map

Thank you for using eBay!
About eBay | SafeHarbor

*Copyright © 1995-1999 eBay Inc. All Rights Reserved.*
All trademarks and brands are the property of their respective owners.
Use of this web site constitutes acceptance of the eBay User Agreement and Privacy Policy.

Prior Art
Figure 1C3

YAHOO! Auctions

Yahoo! - Account Info - Help

Welcome, guest  
Yahoo! Auctions

Submit Item - My Auctions - Options - Sign In

It's Free!

Getting Started
- Bidder Guide
- Seller Guide
- Community

You are not signed in  
You must sign in to bid or sell.  
Yahoo! ID:  
Yahoo! Password:

☐ Remember my ID & Password

Sign In

New User?  
Sign Up Here

Charity Auctions

RAINN Charity Auction

Bid on Tori Amos autographed Steve Madden Shoes

Other Charity Auctions

Pop-up! Missions Troops

Phillies Baseball Tickets

Cal CURE Home Run Challenge

About Charity Auctions

Find Auctions

[      ] Search Options

Antiques & Collectibles *(82,483)*  
Numismatics, Memorabilia, Porcelain...

Arts & Entertainment *(66,816)*  
Books, Music, Movies...

Business & Office *(2,781)*  
Furniture, Fax Machines, Briefcases and Bags...

Clothing & Accessories *(27,816)*  
Jewelry, Women's...

Computers *(29,788)*  
Hardware, Software, Domain Names...

Electronics & Cameras *(6,839)*  
Audio, Video, Cameras & Equipment...

Home & Garden *(12,635)*  
Housewares, Baby Items, Furnishings...

Sports & Recreation *(27,203)*  
Golf, Skiing & Snowboarding, Hobbies and Crafts...

Toys & Games *(116,829)*  
Video Games, Furby, Beanie Babies@...

Trading Cards *(94,001)*  
Baseball, Football, Games@...

Other Goods & Services *(12,691)*  
Services, Flowers...

Full Category Index...

Prior Art  
Figure 2A

YAHOO! Auctions

Yahoo! - Customize - Help - Sign In

Welcome, guest   Submit Item - My Auctions - Options - Sign In

Yahoo! Auctions   Auctions Home

Auctions > Antiques & Collectibles > Furniture > Living Room Sets

    

$54.95   $2200.00   $8.50   $157.00/1 Bid   $17.00

Showing 1 of 1 pages(16 items total)   [Show only photos]   Previous 50 | Next 50

| Photo | Title | Current Bid | Bids | Time Left |
|---|---|---|---|---|
| 📷 | Beautiful Wall Hangings * Great Decoration in Room * | $25.95 | - | 13 hrs |
| 📷 | 2-P-Set Beautiful Wall Hangings * Great Decoration in Room * | $54.95 | - | 18 hrs |
| 📷 | Italian 18 century antique sofa and side chairs | $2200.00 | - | 22 hrs |
| 📷 | A circle of Soapstone Elephants! NR | $8.50 | - | 1 day |
| 📷 | Grandfather Clock 6 foot Don't miss this offer! | $157.00 | 1 | 1 day |
| 📷 | Classic Capiz Candleholder! Beautiful! NR | $17.00 | - | 2 days |
| 📷 | Beautiful Lacquered Cork Sculptures Screen * Great Decoration in Your Room * | $45.95 | - | 2 days |
|  | Gold leaf dinning set | $500.00 | - | 2 days |
| 📷 | Large Sofa Never Used | $50.00 | - | 3 days |
| 📷 | Blue Faux Suede Inflatable Livingroom Suite | $350.00 | - | 3 days |
| 📷 | Grandfather Clock-31 day clock ! (New) | $177.00 | - | 3 days |
| 📷 | 1242 Penny Gumball Machine New! | $93.25 | - | 6 days |
| 📷 | Handsome Dome-topped Rattan Chest w/Metal Frame! NR | $26.00 | - | 6 days |
|  | Black Queen Size Futon/Bed frame with matress | $175.00 | - | 8 days |
|  | Bamboo 17 piece living room set | $1250.00 | - | 8 days |
| 📷 | A very nice set to have for your living room. | $29.99 | - | 9 days |

Showing 1 of 1 pages(16 items total)   [Show only photos]   Previous 50 | Next 50

Alert Me - Email/alert me when new items appear in this category. View Alerts)

Search options

Copyright © 1994-1999; Yahoo! Inc. All Rights Reserved.
Privacy Policy - Terms of Service - Guidelines - Help

Prior Art
Figure 2B

Prior Art
Figure 3A amazon.com
BOOKS | MUSIC | VIDEO | GIFTS | e-CARDS | YOUR ACCOUNT

Auction Search: [____] Go!   Browse: All Categories [▼] Go!

22:28:52 PDT

Browse Categories

Search in Antiques only: [____] Go!

Auctions / Antiques

- General
- Ancient World
- Books & Manuscripts
- Cameras
- Folk Art
- Metalware
- Musical Instruments

- Post-1900
- Pre-1900
- Prints
- Reproductions
- Scientific Instruments
- Textiles & Linens

Featured Auctions

Sort by: End date [▼]  ○ Ascending  ● Descending  Go!

| Picture | Auction Name | Current Bid | Bids | T Rem |
|---|---|---|---|---|
| 📷 | 1518 BOOK RELIGIOUS SERMONS 2 BOOKS IN ONE REALLY NICE SHAPE | $510.00 | 20 | 0 da 13:4 |
| 📷 | MAGNIFICENT OLD PERSIAN RUG | $202.50 | 19 | 0 da 17:4 |
| 📷 | BEATLES~ORIGINAL~1st~US~TOUR~COIN~MINT~SEALED~IN~1964~ | $14.00 | 5 | 0 da 20:2 |
| 📷 | ABSOLUTELY GORGEOUS AND GUARANTEED OLD R. ATKINSON FOX PRINT | $61.00 | 8 | 1 da 15:5 |
| 📷 | Greek SILVER Coin-350 BC, Commemorates the OLYMPIC GAMES !! Must See !! | $139.95 | 1 | 1 da 22:0 |
| 📷 | L@@k at this Sexy Woman... in a new kind of Art..The Pyrograph | $95.00 | 0 | 2 da 14:0 |
| 📷 | Italian Victorian Carved Bedroom Set NICE!! | $2,025.00 | 13 | 2 da 22:0 |
| 📷 | MOGUL EMERALD – Engraved Between 1620 and 1700 - Classic Floral Motif | $788.88 | 0 | 3 da 07:4 |

SYSTEM FOR INTERACTIVE COMPUTER-ASSISTED ON-LINE AUCTIONS

PRIORITY NOTICE

This Non-Provisional U.S. patent application claims the benefit of the Jul. 30, 1999 filing date of Provisional U.S. Patent Application Ser. No. 60/146,702.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

The present invention relates to novel methods and apparatus for conducting, presenting, monitoring, and tracking auctions on-line, for pure Internet auctions, and real-time presentation of physical auctions. The methods and apparatus disclosed in this application can also be use in all on-line object and catalogue presentations and other E-commerce sales and advertising channels and mechanisms.

DESCRIPTION OF RELATED ART

Traditional physical auctions of goods and services take place as events with defined time periods, at defined and limited physical locations where the buyers, on-lookers, commissioned sellers, sellers, trained auctioneers, and the goods gather. In some instances, with pre-arranged facility, remote buyers can be linked at real-time to the auction, via private or public radio, television, or telephone network, and call-in bids remotely over telephone connections. The real-time broadcast or narrowcast of an auction through radio, television, or telephone networks can be costly, and access is usually limited to specific locations/rooms with the relays or connections. Therefore, the conventional physical auction events are considered restricted to a limited buyer audience who can either physically attend the auction at location, during that specific time frame, or be present at a remotely linked facility also at that specific time frame. The costly, time specific physical gathering of a "live" auction event is only worthwhile or feasible for both the auctioneer's and the buyers' sides, if, and only if there is a large number of items to be sold. However, only one item can be "auctioned" at a time, in a physical live auction event. Thus, each item has a very limited time allotment to be on the auction stage.

Some items stimulate more interest than others in an unpredictable way in a time limited physical live auction event. The buyers come to, and leave the event also in somewhat of unpredictable ways, it is difficult for a live auction event to publish and commit to a fixed item-by-item schedule in a catalogue ahead of the event. Therefore, buyers do not know what item would be auctioned at what time frame, and what items would be auctioned next even while at the auction. Buyers do travel to the location; frequently to miss the items most interested, unless he or she is willing to arrive on-time, and commit to sit through the entire auction event without breaks. Wealthy collectors or dealers often go through the preview, note the interested items manually, and give instructions as to the highest price they would be willing to pay for each item to hired professional buyers/bidders to attend the event and do the bidding. The process is manual, labor intensive, and somewhat risky for both the hiring collectors and their hired buyers.

The new Internet "cyber" Auction format, on the other hand, allows buyers, sellers, and spectators to browse and search for information, descriptions, and auction status of goods, and submit bids without geographical or strict time limitations. All items, independently, can be "auctioned" during the same time period, in parallel, and simultaneously. The duration for each "item" in "open auction" is largely defined by the owner of the item or his agent, and independent of other items. The duration is measured in days or weeks, rather than the minutes as custom and necessary in a physical live auction. The beginning and ending times of "open auctions" are published individually in each item's entry. Data entry is left to the owners of objects with templates provided by the sites. The sites has no organized data on what objects may become available for auction, and do not publish up-coming auctions.

At (FIG. 1, Jul. 15, 1999), the largest Internet auction site, millions of objects are "auctioned" at any given time. Search for goods is accomplished through browsing the extensive category trees/paths (FIG. 1A), or entering item type or name through a "search" function. The auction item list obtained through category browsing is astoundingly large, on the order of hundreds to thousands of items, over many tens of webpages (each can be more than one physically printed page), listed with an abbreviated one-line entry or a thumbnail entry for each item. FIGS. 1B1 and 1B2 are 2 pages of a list of "Featured" furniture auction items, and FIG. 1B3 is the $1^{st}$ page of 37 pages of 1761 furniture items being auctioned on the site on Jul. 15, 1999. Note that the right most column indicates the "ending time" of the auctions, mostly ending around July 22 through July 25, a ten day auction time span, impossible to accommodate in conventional "live" auctions, which measure auction time for each item in minutes. Choosing items out of such a large list can only be accomplished by reading through tens or hundreds of one-line abbreviated descriptions of each item, and choosing one item from the list to view the more detailed information about the item, one-at-a-time. Once an item is thus chosen, the browser/buyer clicks on the line or thumbnail entry of the item on the list (see FIG. 1B2, item 122 on the page), and waits for its descriptions to be sent to the screen from the remote site server (FIGS. 1C1 through 1C3.) If the buyer wishes to view more items from the list of hundreds of items, it can only be done, again, one-at-a-time, by clicking "back" to the list, and choose another item, click on the item, wait for page download, thus repeating. When the buyer is viewing information about one interested item, the information for other items previously viewed are gone from the screen. The buyer must print all information of every item, before clicking "back" to the list to access information of another item. The comparison between similar or interested items can only be reasonably done by reading the volume of printout pages of these items. At the mean time, the auction status and current high-bid of some items may have already changed. Although such process is tedious and time consuming, for many people, it is still preferred over making the effort required to attend a conventional physical "live" auction.

Bidding is entered electronically on a bidding screen that usually follows the bidding information, object description, and photograph(s) of the object. For a single item auction, the bid entered at any given time must "beat" the current highest bid to be relevant and logged into bidding history as the updated highest bid. For a "Dutch Auction," where multiple numbers of an identical item are auctioned, the bid must be higher than the current lowest valid bid. Every "current highest bid" is there to be outbid before the "auction time" is still open. It is highly desirable to a serious buyer to monitor the bidding status, and bid only when "closing" time comes near.

With the current state of the art in online auction, such monitoring is accomplished through manually logging onto the site at any particular time, go to the pages where a particular item of interest is described, look up the bidding status of that particular item, and the closing time of this particular auction. Set an alarm clock for certain intervals before its "closing time," for final check, which could be days later. At any moment between the time you last manually checked the auction status, and the time of the alarm, the auction status can only be updated by manually and periodically logging on to the site, and going to the particular pages describing the item, one item at a time. If the buyer is interested in a number of items, the process is extremely tedious, time consuming, and unreliable. One can enter a bid, request email notification from the site when the bid is "outbid" by another buyer. However, this is a one-time only notification. To be notified again, one must enter another bid that beats the current highest bid, and risking buying the object at that price, or to be outbid again.

For a physical live auction event, there is no way to monitor the event other than being physically present.

FIGS. 2A-2B are screen prints of and FIGS. 3A, and 3B are screen prints of illustrating the two sites' identical formats to. This universal Internet Auction Format is used with very minor variations on the theme in all state-of-the-art auction sites. Basically, the home pages of the auction sites contain a primary category listing, a "featured" listing, a "search" entry box, and some informational/promotional icons, textual descriptions, and links. Clicking on a category title on the primary category list brings the next page containing the listing of the next level of categories under that particular category, and a list of the "featured" items in that category. Clicking on one "featured" title brings information about that one particular "featured" item. Similarly, clicking on brief descriptions of promotional or informational entries and icons brings more detailed information about the entry. Clicking on a subcategory brings the listing of the next level subcategories and the "featured" items in that subcategory, until the particular category path is exhausted. Then, all items under that end category is listed over many web pages, accessible one web-page at a time, each containing more than one physical print page. Links to information of Items listed on a web page are accessible also one-item-at a time. Entering a search word or a search phrase brings a list of items that contain the word or phrase in the tagging header or in the description.

Although facilitated to provide simultaneous auctions, Internet format of the known-art does not allow viewing, monitoring, or tracking of simultaneous auctions of multiple items. As described previously, a buyer can elect to visit the "biding" screen, enter a bid for each interested item, and request to have electronic-mail (email) sent to his/her email account as a one-time notification when a bid is outbid. Or the buyer can periodically log-on to the auction site, and manually search and browse for status information of interested items, one at a time.

SUMMARY OF THE INVENTION

The present invention relates to novel methods and apparatus for conducting, presenting, monitoring, and tracking auctions on-line, for pure Internet auctions, and for real-time internet presentation of live physical auctions. The "current" auction objects are presented in moving graphical arrays that can be sorted by columns or rows, commanded to moved to show items beyond the screen, or stopped to select individual items to obtain further information or to be monitored and tracked. The "up coming" objects that are soon to be "open" for bidding are shown on a separate strip on the screen. The strip "cycles" onto the screen to accommodate displaying more objects, than the screen size can accommodate. The moving strip can also be activated to step in the opposite direction, or stopped for detailed view, or selected for monitoring, tracking, or to obtain further information. The displaying and selection method and apparatus can also be used for other e-commerce sales channels and catalogs.

Selected objects from different categories, or even different sites can be monitored and tracked on the same screen.

Self-rotating, automated Virtual Reality is used to display three-dimensional objects. Split screen allows video broadcasting, narrow casting, or streaming of "live auction" events alongside detailed still or virtual reality images of auctioned objects, their descriptions, and the bidding entry form, as well as the running strip cataloguing the upcoming lots/items.

The methods and apparatus disclosed in this application can also be use in other types of on-line object and catalogue displays, and other E-commerce channels and services, in addition to the auction format.

BRIEF DESCRIPTION OF THE DRAWINGS

FIG. 1A: Known-Art Auction Format. Only ONE link (one item)—can be clicked at any time on any page, as in all Internet web pages. FIG. 1A also shows the home page, with its $1^{st}$ level categories listed on the left side of the page, the "featured" items listed in the middle of the page, and the "search" box at top center of the page.

FIGS. 1B1 and 1B2 are one-line descriptions of "featured" items in the Furniture category.

Figure 3A:
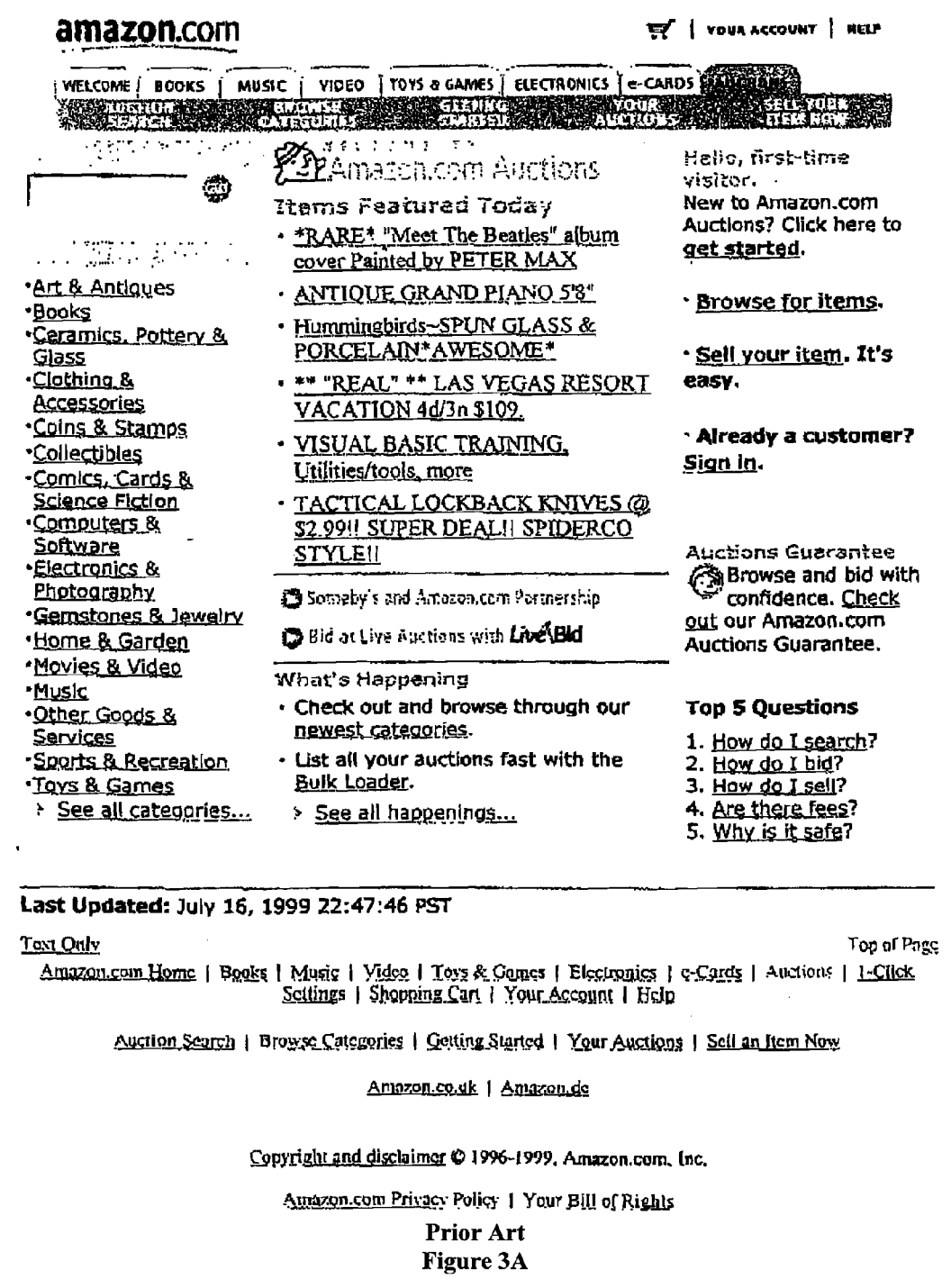

FIG. 1B3 is the first of the 37 web-pages listings of 1,761 furniture items currently being auctioned on the site.

FIGS. 1C1 through 1C3 are detailed description and bidding status of item 122, Super Turn of Century Oak Victorian Secretary, listed on FIG. 1B2.

FIG. 2A is the home page with the $1^{st}$ level category listings where, for example, "Antiques & Collectibles" is one of the several 1st level category listings displayed.

FIG. 2B lists 5 featured items on top of the page, and a total of 16 items in the "Living Room Set" category. The page is sent from the site server, when the "Living Room Set" category in "Furniture" category under "Antiques & Collectibles" category is clicked. The hierarchy of the category levels is displayed above the 5 featured items on the page.

FIG. 3A is the home page, listing the $1^{st}$ level categories on the left side, and 6 "featured" items in the middle of the page.

FIG. 3B lists the second level categories under the "Antiques" category, and the "Featured Auctions" in the "Antiques" category.

FIG. 4A shows the "featured", and "search," or "category" browsing results are shown in a graphical array, with multiple-select capabilities. The "upcoming" auctions are announced in a cycling or stationary (scrolled to view) margin-strip at the right side. The "present" auctions are presented in rows.

Each row of the array can advance to left, back to right, continually move (GO button) to show more items, or stop, at command by clicking on the commend buttons at the left margin of the row. The "upcoming" column on the right has similar functions. The movement for the column is up-down movement.

In this particular presentation example, we have chosen 3 categories and the "featured." The same method and apparatus can present items of the same category, or the subcategories within a category, for example, separating sports cars of different manufacturer.

Figure 4A:
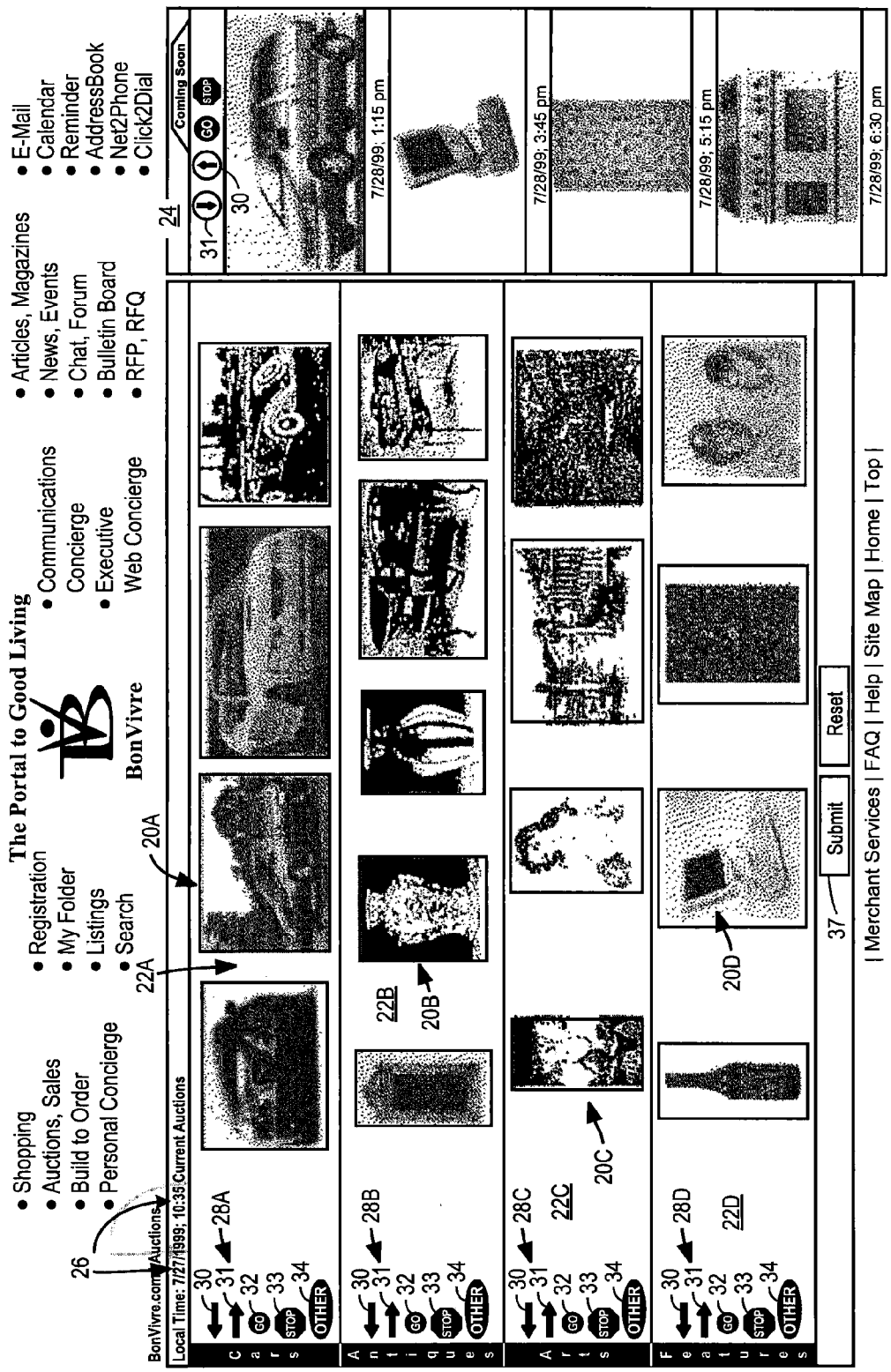
FIGS. 4A-4D: An example of an On-Line Auction presentation implemented with the current invention.
Figure 4B:

FIG. 4B shows the screen shot of the Auction home-page screen at some time later. Due to exercising the moving functions, some items have changed positions on the array, some items have left the screen, and some items not shown in 4A appear on the screen.

Figure 4C:
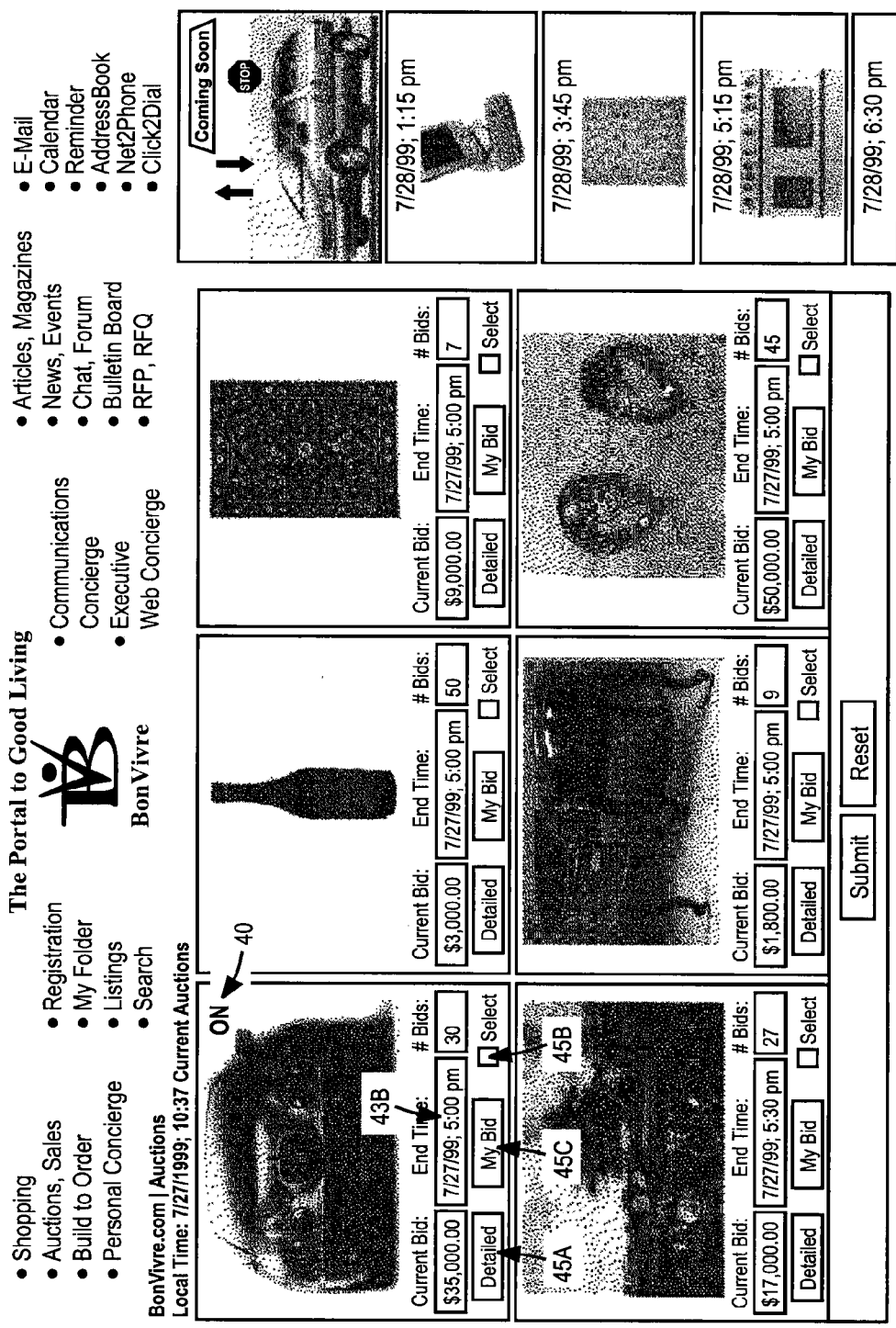

FIG. 4C shows the selected items from FIGS. 4A and 4B appear on a monitoring screen. The screen is automatically tracked/updated by synchronizing with the server data at user programmable intervals. Object that should be seen from all sides has an "On" button in a portion of its still image. Clicking the "ON" button turns on the Virtual Reality with automated rotation as well as mouse driven rotation features. The "ON" button can be replaced by "VR" or any other form that representing turning on "Virtual Reality." Detailed information for each monitored object can be called individually by clicking on the "Detail" button, or selectively and collectively by clicking the "select" boxes, and submitting requests to the server after completing the selection process. The object positioning in the array can be sorted with various criteria at user request or default setting. The "alert" can also be programmed, for example, to surround "End Time" box with small blinking stars, or any other attention causing signal, to signal the end of "open" auction within 30 minutes (or an hour), and blinking red stars for "My bid" button when "my bid" is out bid.

Figure 4D:
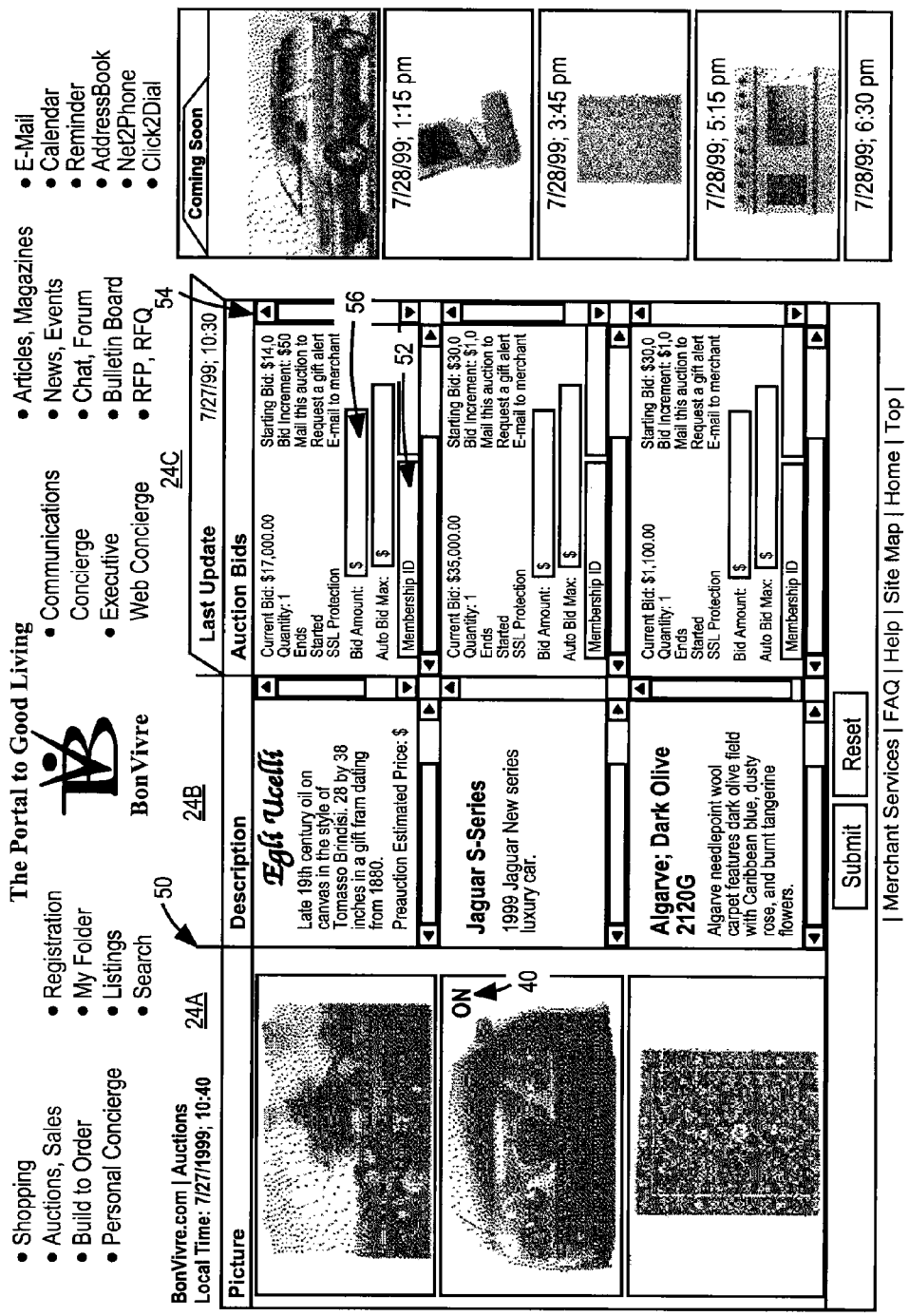

FIG. 4D shows selection of objects monitored in screen FIG. 4C for viewing detailed information and access bidding apparatus collectively, would bring this screen after submitting the selection. In this example, The Egli Ucelli landscape painting, the Jaguar S-series, and the Algarve rug are selected.

Figure 5:
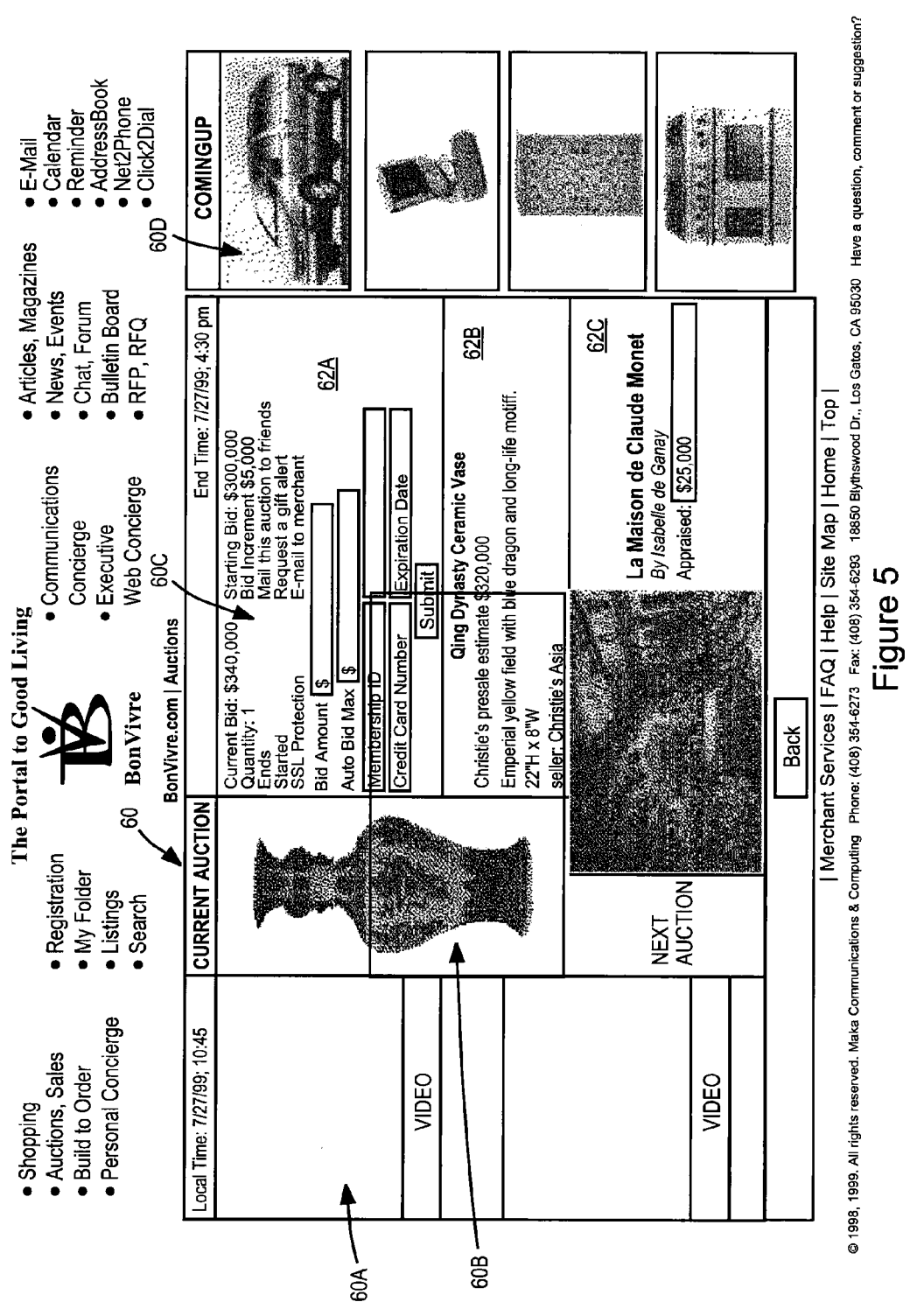

FIG. 5 shows an example of the "Live" Auction Format of the Present Invention.

DETAILED DESCRIPTION OF THE INVENTION

The present invention relates to novel methods and apparatus for conducting, presenting, monitoring, and tracking auctions on-line, for pure Internet auctions, and for real-time linking to physical auctions. The "current" auction objects are presented in moving graphical arrays 20A, 20B, 20C and 20D that can be sorted by rows 22A, 22B, 22C and 22D or columns, and moved bi-directionally to show more items than the computer screen size can accommodate, or stopped to select individual items to obtain further information, or to be monitored and tracked. The "up coming" objects that are soon to be "open" for bidding are shown on a separate strip 24 on the screen. The strip 24 and the sorted rows 22A, 22B, 22C and 22D or columns can be commanded to "cycle" onto the screen continually to display objects beyond the screen. The moving strip 24 can also be activated to step in both directions, and stopped for detailed view or selection for monitoring, tracking, or to obtain further information. The displaying and selection method and apparatus can also be used for displaying catalogs and other e-commerce channels and services.

Selected objects from different categories, or even different sites can be monitored and tracked on the same screen.

Self-rotating, automated Virtual Reality is used to display three-dimensional objects. Split screen 60 (FIG. 5) allows video broadcasting, narrow casting or streaming of "live auction" events, or fashion catwalk events 60A alongside detailed images of auctioned objects 60B, their descriptions, and the bidding entry form, as well as the running strip cataloguing the upcoming lots/items for auction or catwalk.

The methods and apparatus disclosed in this application can also be use in other types of on-line object and catalogue displays and other E-commerce channels, mechanisms, and services in addition to the auction format.

The present invention presents objects presently open for auction in each category on a graphical array 20A, 20B, 20C or 20D, with the "up coming auctions" running on a margin strip 24. A time stamp 26 signifies the time the information is loaded to the computer at its latest synchronization/up-date. The array 20A, 20B, 20C or 20D can be sorted by user specified or default criteria in columns or rows. Command buttons 28A, 28B, 28C, 28D or 28E providing options allowing viewers to start, or stop the cycling, use the scroll button to scroll up or down, or left or right, to see more items. The bidder/viewer selects interested objects from the array 20A, 20B, 20C or 20D of either the same category, or from different categories, or even from different sites, and/or the interested "upcoming" objects from the margin strip 24. The "auction wizard" of the current invention fetches the detailed information and enlarged graphics of the selected items from the site databases, and composes a personalized auction monitor screen (FIG. 4C) for the bidder/viewer. The screen is automatically updated with new status, at user programmable intervals. If the bidder/viewer's computer is disconnected from the server, the synchronization occurs automatically upon reconnection.

Differentiated level of selections can be made, and the array presentation can be sorted by category, or with other criteria of differentiation. "Alert" is programmed to user selectable criteria, such as closing time, outbid, etc. Default setting can be provided, for example, to alert closing time in one hour or less, or outbid by others.

Dropping items from monitoring screen (FIG. 4C) can also be programmed to criteria, such as highest bid going beyond a certain price, or successful final bid of another similar item, etc. Monitoring is automatically dropped when closing is over, and status sent to "closed auction report" folder.

Automated 3D Virtual Reality presentation is used to display three-dimensional objects, such as sculptures, cars, lamps, or furniture, revolving on the screen automatically. "ON" Buttons 40 are provided to the VR presentation for viewer to elect using the mouse to rotate the object, or to resume the automated rotation. The "ON" button 40 is provided on still images of three-dimensional objects for activating Virtual Reality presentation upon clicking.

"Split Screen" 60 accommodates broadcasting, narrow casting, and streaming video 60A for viewing the live auction events, alongside the web images, VR or 3D presentations of the object 60B, detailed textual descriptions, and the online "bidding" mechanism 60C, for linking "live auction" sessions to the on-line auction network.

An example of an On-Line Auction presentation implemented with the current invention is illustrated in FIGS. 4A-4D. FIG. 4A shows "search," or "category" browsing results, and the "featured" items in a graphical array, with multiple-select capabilities. The "upcoming" auctions are announced in a cycling or stationary (scrolled to view) margin-strip 24 at the right side. The "present" auctions are presented in rows 22A, 22B, 22C and 22D, and sorted in rows according to category criteria.

A set of command buttons 28A, 28B, 28C and 28D are placed at the left margin of each row 22A, 22B, 22C and 22D, respectively, to enable each row 22A, 22B, 22C and 22D of the array to advance to the left, or back to the right by pressing the mouse button on the arrows 30 or 31, or to continually move for showing more items beyond the screen by clicking on the "GO" button 32, or stop at command by clicking on the "STOP" button 33. The "Other" button 34 allows the viewer to select to view items from other categorization. The "upcoming" column on the right (strip 24) has similar functions. The movement for the column is up-down movement via arrows 30' and 31' instead of the left-right for the rows of "present auctions."

In this particular presentation example, we have chosen 3 categories and the "featured" items for the rows. Other criteria can be used, such as displaying subcategory items from the same category, for example, sports cars of different manufacturer, or displaying same category items sorting by ending time, etc.

Each item on the array is selectable. The viewer can select as many items from the array as desired for monitoring, for detailed information, or for bidding. When the selection process is completed, the viewer "submits" the selection by clicking the mouse button on the "Submit" button 37 located at the bottom of the screen.

FIG. 4B shows the FIG. 4A screen at some later time. Due to exercising the moving functions, some items have changed positions on the array, some items have left the screen, and some items not shown in FIG. 4A appear on the screen.

FIG. 4C displays the viewer-selected items from FIGS. 4A and 4B on a monitoring screen. The screen is automatically tracked/updated by synchronizing with the server data at user programmed or default intervals. Three-dimensional object that should be seen from all sides has an "On" button 40 in a portion of its still image. Clicking the "ON" button 40 turns on the Virtual Reality with automated rotation as well as mouse driven rotation features. The "ON" button 40 can be replaced by "VR" or any other form that representing turning on "Virtual Reality." Detailed information for each monitored object can be called individually by clicking on the "Detailed" button 45A, or selectively and collectively by clicking the "select" boxes 45B, and submitting requests to the server after completing the selection process. The object positioning in the array can be sorted with various criteria at user request or default setting. The "alert" can also be programmed, for example, to surround "EndTime" box 43B with small blinking stars, or any other attention causing signal, to signal the end of "open" auction within 30 minutes (or an hour), and blinking red stars for "My bid" button 45C when "my bid" is out bid.

Selecting objects monitored in screen FIG. 4C for viewing further detailed information and access-bidding apparatus collectively would bring the screen 50 shown in FIG. 4D after submitting the selection. In this example, The Egli Ucelli landscape painting, the Jaguar S-series, and the Algarve rug are selected. The Jaguar has Virtual Reality presentation, activated by clicking on the "ON" button 40. The column 24B in the middle are textual descriptions for the items, and the Auction bids column 24C to the right is where the auction status is presented, updated, and where bids (in "Bid Amount" box 56) can be entered. The membership ID number 52 only has to be entered once. The scroll bars 54 indicates there is more information in the box than what is shown. When the cursor is moved into the frame, where only partial information is shown, the full frame would pop-up.

FIG. 5 shows an example of the "Live" Auction Format of the Present Invention. The 2 boxes at left are real-time, live streaming, broadcasting, or narrowcasting of live scenes at the physical auctions. The upper portion of the second column 60B from the left displays either still image of a 2-D object, or still image of a 3-D object, with Virtual Reality option upon clicking on the still image. The upper portion of the $3^{rd}$ column 60C includes bidding screen 62. A and description screen 62B. The lower portion 62C displays the next item to be auctioned, and the right column 60D displays the upcoming objects after the next auction in their time order. Bringing the cursor onto an image, the brief description is shown in a floating box. Clicking on the image brings detailed descriptions.

The present invention is implemented using software which can be written in many programming languages, or implemented with many web-page generation tools. The present invention can be used on a global or local computer network, on a personal computer, on viewable storage media such as a CD ROM, on a wireless telephone, on a wireless personal assistant such as a Palm Pilot®, or on any type of wired or wireless device that enables digitally stored information to be viewed on a display device. Also, information displayed and viewed using the present invention can be printed, stored to other storage medium, and electronically mailed to third parties.

Numerous modifications to and alternative embodiments of the present invention will be apparent to those skilled to the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A system for an interactive, computer-assisted on-line auction using a computer with a display, comprising:
   means for causing said display to display a plurality of independently moving graphical arrays so that all independently moving graphical arrays of the plurality of independently moving graphical arrays are displayed together on said display, each independently moving graphical array of the plurality of independently moving graphical arrays including a plurality of objects from a category for auction, wherein each object of any one independently moving graphical array of the plurality of independently moving graphical arrays is individually selectable for monitoring and bidding;
   means for displaying on said display a plurality of sets of array control buttons for controlling the movement of the independently moving graphical arrays of the plurality of independently moving graphical arrays, each respective set of array control buttons being associated with a different independently moving graphical array of the plurality of independently moving graphical arrays;
   personalized auction monitor for personalized auction monitoring of objects from the plurality of independently moving graphical arrays that have been selected for monitoring and bidding by a bidder, wherein the personalized auction monitor is periodically and automatically updated with new status information at user programmable intervals;
   means for displaying the selected objects for monitoring all together;
   bid submitter for submitting a bid online for any one of the monitored objects; and
   means for automatically dropping from the personalized auction monitor the objects that have been selected for monitoring and bidding by the bidder in response to preprogrammed at least one event, wherein the at least one event comprises a first event, the first event causing a selected object to be dropped from the personalized auction monitor in response to a bid for the selected object going beyond a predetermined price.

2. The system according to claim 1, wherein said each independently moving graphical array includes a still image of said each object of the plurality of objects.

3. The system according to claim 1, wherein said each graphical array being individually selectably scrolled to bring within view of the display those objects previously not within view of the display; and said each respective set of array control buttons includes:
continuous cycling button for selectively commanding the respective graphical array to cycle continually onto said display those objects, of said respective graphical array, beyond the screen of said display.

4. The system according to claim 3, wherein said each respective set of array control buttons includes control buttons so that said each independently moving graphical array can be scrolled bi-directionally.

5. The system according to claim 3, wherein said plurality of independently moving graphical arrays is sorted into rows or columns according to different criteria.

6. The system according to claim 1, further comprising:
multi-select function for selecting by the bidder a subset of the plurality of objects, all together, from each independently moving graphical array for viewing, monitoring and bidding.

7. The system according to claim 1, further comprising position sorter for selectively sorting by the bidder the position of the objects in said each independently moving graphical array by different criteria.

8. The system according to claim 1, wherein the bid submitter includes detailed information about a respective one monitored object.

9. The system according to claim 1, wherein the personalized auction monitor for each selected object includes a textual description of the object and information regarding the status of the auction for the object as well as a bid submission box for the object.

10. The system according to claim 1, wherein the plurality of independently moving graphical arrays comprises a first array and a second array, the first array of the plurality of independently moving graphical arrays displays objects that are being auctioned at the time they are depicted in the first array, and the second array of the plurality of independently moving graphical arrays displays objects to be auctioned at a future time.

11. The system according to claim 10, further comprising timestamp display for displaying, on the display, a timestamp indicating the time at which the objects to be auctioned at a future time will be auctioned.

12. The system according to claim 10, wherein said each respective set of array control buttons further enables the bidder to selectively stop and start scrolling of the first array independently of the other arrays of the plurality of independently moving graphical arrays.

13. The system according to claim 1, wherein said each respective set of array control buttons enables the bidder to selectively control speed of scrolling of the respective graphical array.

14. The system according to claim 1, wherein said each respective set of array control buttons enables the bidder to selectively control direction of scrolling of the respective graphical array.

15. The system according to claim 14, wherein the respective graphical array scrolls horizontally on the display.

16. The system according to claim 14, wherein the respective graphical array scrolls vertically on the display.

17. The system according to claim 1, wherein the plurality of independently moving graphical arrays comprises a first graphical array and a second graphical array, the first graphical array of the plurality of independently moving graphical arrays includes only objects to be auctioned at a future time and the second graphical array of the plurality of independently moving graphical arrays includes only objects being currently auctioned.

18. The system according to claim 1, further comprising at least one visual cue to alert the bidder of a particular occurrence.

19. The system according to claim 18, wherein the particular occurrence is that a selectively predetermined amount of time remains to submit a bid on an object before the auction for the object terminates.

20. The system according to claim 1, further comprising at least one audible cue to alert the bidder of a particular occurrence.

21. The system according to claim 1, further comprising control to selectively rotate those objects which are three-dimensional objects on the display for three-dimensional viewing.

22. The system according to claim 1, wherein the objects in the plurality of independently moving graphical arrays comprise a first object from a first site, and a second object from a second site, the second site being different from the first site.

23. The system according to claim 1, wherein the plurality of independently moving graphical arrays comprises a first array with objects from a first category, and a second array with objects from a second category, the first category being different from the second category.

24. A system for an interactive, computer-assisted on-line auction using a computer with a display, comprising:
a plurality of independently moving graphical arrays adapted to be displayed together on said display, each independently moving graphical array including a plurality of objects from a category for auction, wherein each object of any one independently moving graphical array is individually selectable for monitoring and bidding;
a plurality of sets of array control buttons for controlling the movement of the moving graphical array, each respective set of array control buttons is associated with a different independently moving graphical array;
personalized auction monitor for personalized auction monitoring of those objects selected by a bidder;
monitored object display for displaying the selected objects for monitoring all together;
bid submitter for submitting a bid online for any one of the monitored objects;
a split screen for displaying broadcasts, narrow casts and streaming video for viewing live auction events alongside web images, three-dimensional presentations of objects, detailed textual descriptions of objects and an on-line bidding mechanism for linking the bidder to live auction sessions; and
means for automatically dropping from the personalized auction monitor the objects that have been selected for monitoring and bidding by the bidder in response to preprogrammed at least one event, wherein the at least one event comprises a first event, the first event causing a selected object to be dropped from the personalized auction monitor in response to a bid for the selected object going beyond a predetermined price.

* * * * *

UNITED STATES PATENT AND TRADEMARK OFFICE
CERTIFICATE OF CORRECTION

| | | |
|---|---|---|
| PATENT NO. | : 7,542,920 B1 | Page 1 of 1 |
| APPLICATION NO. | : 09/628773 | |
| DATED | : June 2, 2009 | |
| INVENTOR(S) | : Catherine Lin-Hendel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Twelfth Day of October, 2010

David J. Kappos
*Director of the United States Patent and Trademark Office*